United States Patent
Mock et al.

(10) Patent No.: US 9,212,068 B2
(45) Date of Patent: Dec. 15, 2015

(54) WATER PURIFICATION DEVICE

(71) Applicant: Creaholic S.A., Biel (CH)

(72) Inventors: Elmar Mock, Colombier (CH); Marcel Aeschlimann, Ligerz (CH); Christoph Rusch, Biel (CH); Andre Klopfenstein, La Neuveville (CH)

(73) Assignee: CREAHOLIC S.A., Biel (CH)

( * ) Notice: Subject to any disclaimer, the term of this patent is extended or adjusted under 35 U.S.C. 154(b) by 51 days.

(21) Appl. No.: 14/192,991

(22) Filed: Feb. 28, 2014

(65) Prior Publication Data

US 2014/0175014 A1 Jun. 26, 2014

Related U.S. Application Data

(63) Continuation of application No. 12/747,707, filed as application No. PCT/CH2008/000515 on Dec. 4, 2008, now abandoned.

(30) Foreign Application Priority Data

Dec. 13, 2007 (EP) .................................. 07405353

(51) Int. Cl.
*B01D 29/11* (2006.01)
*C02F 1/00* (2006.01)
(Continued)

(52) U.S. Cl.
CPC .............. *C02F 1/002* (2013.01); *B01D 29/117* (2013.01); *B01D 61/18* (2013.01); *B01D 63/00* (2013.01); *B01D 2313/18* (2013.01); *B01D 2313/24* (2013.01); *C02F 1/44* (2013.01)

(58) Field of Classification Search
CPC .............. B01D 29/00; B01D 29/0029; B01D 29/0031; B01D 29/0034; B01D 29/0036; B01D 29/0043; B01D 29/0038; B01D 29/004; B01D 29/11; B01D 29/111; B01D 29/114; B01D 29/33; B01D 29/15; B01D 29/13; B01D 29/19; B01D 29/31; B01D 29/333; B01D 33/0003; B01D 33/0093; B01D 33/29; B01D 33/70; B01D 33/72; B01D 33/74; B01D 35/00; B01D 35/02; B01D 35/05; B01D 35/301; B01D 2201/0415; B01D 2201/10; B01D 2201/20; B01D 2201/202; B01D 2201/30; B01D 2201/301; B01D 2221/12; B01D 2221/04; B01D 2313/24; B01D 29/0002; B01D 29/0018; B01D 29/002; B01D 29/21; B01D 2315/06; B01D 23/00; B01D 23/02; B01D 23/06; B65D 1/225; B65D 5/36; B65D 5/3635; B65D 11/18
USPC ........... 210/637, 741, 767, 808, 800, 97, 137, 210/153, 172.2, 209, 220, 232, 235, 241, 210/242.1, 242.4, 416.1, 416.2, 416.3, 210/416.4, 416.5, 464, 542, 776, 230, 418
See application file for complete search history.

(56) References Cited

U.S. PATENT DOCUMENTS 2,751,953 A 6/1956 Grimm
4,743,370 A * 5/1988 Mizusawa ..................... 210/460
(Continued)

FOREIGN PATENT DOCUMENTS

DE 3007075 9/1981
EP 0121099 10/1984
(Continued)

*Primary Examiner* — Allison Fitzsimmons
(74) *Attorney, Agent, or Firm* — Rankin, Hill & Clark LLP

(57) ABSTRACT

A water purification device includes an expandable water collecting device having a variable volume, wherein at least part of the surface of the water collecting device includes a filter area, the filter area being permeable to water and allowing water to enter the water collecting device when the filter area is submerged in water. The device further includes a mechanically driven expansion means for exerting a force for increasing the volume of the water collecting device and thereby drawing water through the filter area into the water collecting device. In use, the water collecting device is submerged and the expansion means is released, drawing water into the water collecting device through the filter membrane.

12 Claims, 3 Drawing Sheets

(51) Int. Cl.
*B01D 61/18* (2006.01)
*B01D 63/00* (2006.01)
*C02F 1/44* (2006.01)

(56) References Cited

U.S. PATENT DOCUMENTS

| | | |
|---|---|---|
| 5,049,267 A | 9/1991 | Sasaki et al. |
| 5,200,073 A | 4/1993 | Steere et al. |
| 5,897,012 A | 4/1999 | Sortwell |
| 5,928,516 A | 7/1999 | Hopkins et al. |
| 2002/0008062 A1 | 1/2002 | Torigoe |
| 2003/0057149 A1 | 3/2003 | Iwamoto |
| 2006/0249440 A1 | 11/2006 | Kaminski et al. |

FOREIGN PATENT DOCUMENTS

| | | |
|---|---|---|
| EP | 2070874 | 6/2009 |
| WO | 2005/049500 | 6/2005 |
| WO | 2010/054300 | 5/2010 |

\* cited by examiner

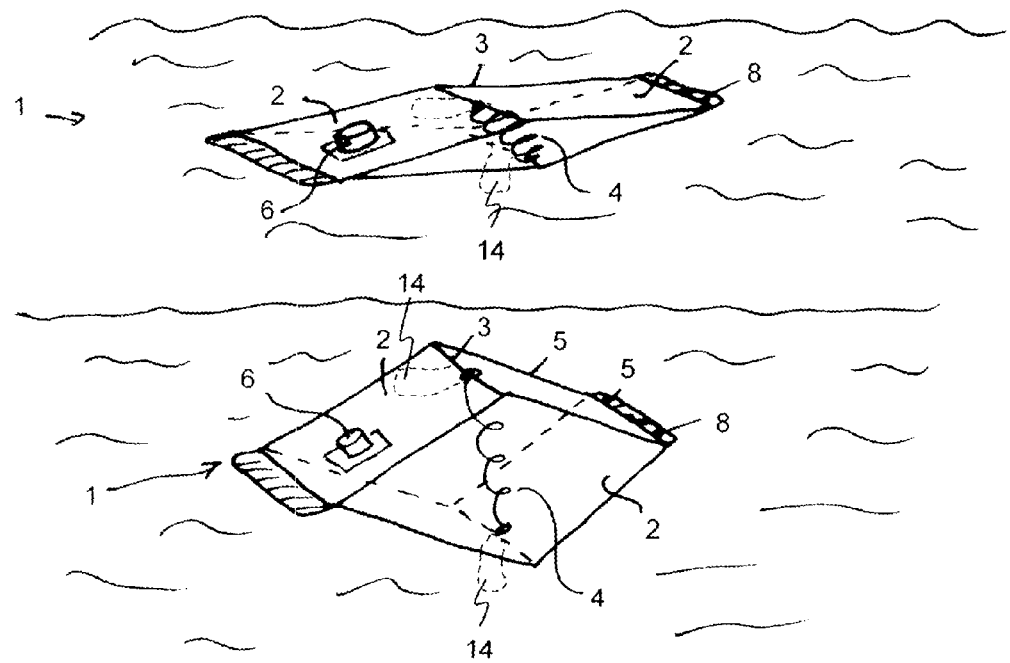
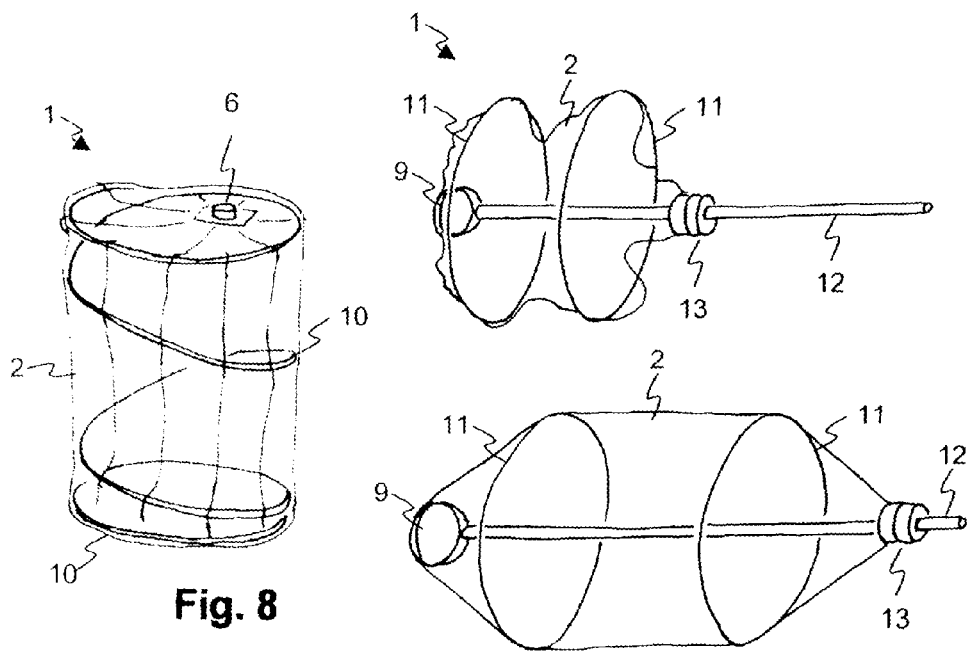
Fig. 1
Fig. 8
Fig. 9

WATER PURIFICATION DEVICE

BACKGROUND OF THE INVENTION

1. Field of the Invention

The invention relates to the field of water purification devices, and in particular to a low-cost, small scale purification.

2. Description of Related Art

Access to clean water is an essential human necessity. In developing countries, in emergency situations, and simply for outdoor activities, there is a need for simple, lightweight, and cheap water purification devices. Numerous filtering devices, e.g. using ceramic filters, multiple water collecting devices with intervening filters etc. are known.

U.S. Pat. No. 4,879,030 describes a water purification and emergency nutrition package. The package comprises a compartment having a semipermeable membrane which allows it to desalinate water, and a compartment comprising a mixture of water-soluble nutrients such as fructose. Once a minimum amount of water has entered the package, osmotic pressure caused by the water-soluble nutrients drives the further transfer of water through the semipermeable membrane. Applicability of the device is limited in that it can be used only once, in that it does not provide water alone, but rather a mixture of water and sugars, i.e. nourishment, and in that it is focused on the desalination of sea water.

US 2002/008062 A1 discloses a water purifier comprising a cylindrical body and a piston sliding inside the cylinder. The piston can be manually withdrawn, sucking water through a filter and into the device. Pushing the piston back causes the water to be expelled through the same filter.

BRIEF SUMMARY OF THE INVENTION

It is therefore an object of the invention to create a water purification device of the type mentioned initially, which overcomes the disadvantages mentioned above.

The water purification device comprises an expandable water collecting device having a variable volume, wherein at least part of the surface of the water collecting device comprises a filter area, the filter area being permeable to water and allowing water to enter the water collecting device when the filter area is submerged in water. The device further comprises a mechanically driven expansion means, for exerting a force for increasing the volume of the water collecting device and thereby drawing water through the filter area into the water collecting device.

For use, the water collecting device is first compressed, that is, brought into a reduced volume or, ideally, a minimum volume configuration. This is done e.g. by flattening the water collecting device, counteracting the force of the expansion means. While flattening the water collecting device, a clean water outlet should be opened, allowing air trapped in the water collecting device to escape. For practical reasons, the water collecting device will preferably also be delivered and stored in a reduced volume configuration. The water collecting device is then submerged in water that requires filtering before consumption, i.e. in a well or a river or the like. The water collecting device may also be left to rest on the water, with the filter area being at least partially submerged, i.e. in contact with the water. The expansion means is then released, allowing the water collecting device to expand, whereby water enters the water collecting device through the filter membrane. When a predetermined amount of filtered water has accumulated inside the water collecting device, the water collecting device is removed from the water, and the filtered water is drained from the water collecting device through an outlet. The water collecting device is extremely simple to use.

In situations in which air flows through the filter area rather rapidly, the water collecting device may expand before being submerged, by taking in air through the filter. Therefore, in a preferred embodiment of the invention, a retainer or restraint is arranged to keep the water collecting device in the reduced volume configuration until it is submerged. This can be done, for example, by a bracket or clip reaching around the water collecting device and holding it in a compressed, reduced volume configuration. The bracket is slid off or pulled away after submerging the water collecting device. Alternatively, the water collecting device may be held in the reduced volume configuration by hand until it is submerged.

In a further preferred embodiment of the invention, the water collecting device comprises an escape valve, e.g. molded from elastic plastic. This allows one to manually submerge the water collecting device and then to manually compress the water collecting device while holding it under water, forcing out remaining air through the escape valve. The water collecting device preferably further comprises an outlet for removing clean water accumulated in the water collecting device; alternatively, the outlet may be identical to the escape valve, since it is only necessary to empty the water collecting device through the outlet valve, whereas the water collecting device is filled through its filter surface. The outlet may be reclosable.

In order to ease the submerging, in case some air is trapped in the water collecting device, the water collecting device preferably comprises a means for attaching a weight or for being attached to an external support. Said means can be an eyelet or grommet, or a piece of string or band attached to the water collecting device. The band may be made of the same material as the water collecting device, e.g. a strip of material that is partially cut from a sheet constituting the water collecting device.

In a further preferred embodiment of the invention, the water collecting device comprises holding elements such as straps. These straps may be attached in, or close to, regions which are pushed away from each other by the expansion means. In consequence, an expansion force can be generated or increased by manually pulling the holding elements.

The water collecting device is preferably made of a flexible sheet material shaped to form a container (except for the fact that the container walls are, at least in the filter areas, permeable). Preferably, the entire container, or at least three quarters or at least half of the surface of the container is made of the flexible sheet material. Thus, the volume of the container is defined by the flexible sheet material, and the container increases its volume by inflating and unfolding the sheet material. For example, the water collecting device comprises two sections of a filter membrane material that are joined in a watertight manner along edges of the sections, forming in the expanded state of the water collecting device, a substantially pillow-shaped bag. Or, the water collecting device may be formed by a cylindrical filter surface, which is expanded by a helical spring inside the water collecting device. A multitude of other geometrical shapes which can be folded and unfolded and in this manner exhibit two different volumes may be used for the water collecting device.

In a preferred embodiment of the invention, a substantial part of the entire surface of the water collecting device is made of a material serving as the filter. In other preferred embodiments, at least a quarter or at least half the surface area of the water collecting device is made of said filtering material. The filter is permeable to water but impermeable to a group of water contaminants, reducing the concentration of contaminants in the filtered water. The filter may be a simple mechanical filter, inhibiting passage of particles exceeding a predetermined size, but may also be chemically treated or coated or comprise multiple layers implementing different water treatment functions and mechanical functions. The filter pore size is preferably smaller than one micrometer, and in particular smaller than 0.5 or 0.1 micrometers or less, for filtering out bacteria and preferably also viruses. The filter, and the water collecting device as a whole, are preferably made of a biodegradable material. Preferably, the filter material is treated to make it hydrophilic. As a result, the minimum pressure, at which the water flow through the filter is triggered, is decreased.

The water treatment and mechanical functions implemented by said multiple layers are, for example: fine pore filtering, chemical treatment, charcoal filter, stiffening the container walls of the water collecting device, mechanical reinforcement, or mechanical protection. Each of these functions may be implemented by a dedicated layer, or one or more functions may be implemented by a single layer.

In further embodiments of the invention, the layer or layers may be treated by welding them along welding lines or in a plurality of welding points. This serves to reinforce, join, and/or to stiffen the layers.

In a further preferred embodiment of the invention, when the water collecting device is in a first configuration, comprising a reduced volume, the expansion means comprises stored energy, and release of said stored energy causes the volume of the water collecting device to increase. In other words; the expansion means comprises, in a loaded state, potential spring energy, which is used to expand the water collecting device from a substantially empty, low volume state, to an unloaded or released state in which it is filled with water, and in which the expansion means is in a state of minimal energy. In a further preferred embodiment of the invention, the expansion means is arranged inside the water collecting device.

In a preferred embodiment of the invention, the first configuration corresponds to an essentially flat configuration of the expansion means, and the increase of volume of the water collecting device corresponds to the expansion means assuming a three-dimensional configuration.

In the reduced volume state, the water collecting device is well suited for efficient storage and transport. Thus, the water collecting device will preferably be produced to be stored in a reduced volume state, e.g. pre-folded, with the faces of the water collecting device being folded inwards or outwards.

The expansion means preferably comprises at least one resilient element which releases stored energy by deforming, i.e. by changing its shape, in particular by at least one of the following: bending, unbending, expanding, and contracting.

The expansion means preferably comprises one or more struts that form a frame supporting the water collecting device and transferring and distributing the forces for expanding the water collecting device to the water collecting device surface. The struts themselves constitute resilient elements for releasing stored energy and/or are arranged in co-operation with separate resilient elements for releasing stored energy. A strut may, for example, be an elongated, stick-like body, or a section of a flat but elastic sheet of material, or a perforated sheet of elastic material.

In the case in which the expansion means comprises, in addition to the struts, separate resilient elements, these resilient elements may be arranged, in order to increase the volume of the water collecting device:
to effect a change of angle between adjacent struts; or
to push sections of the struts away from each other; or
to pull sections of the struts towards each other.

For example, the expansion means may comprise two flat, star-shaped structures, e.g. made of a plastic sheet, arranged inside a pillow-like bag or container and pressed apart by a spring. Or, in another preferred embodiment of the invention, the expansion means comprises a frame of flexible wires that can be bent into a flat shape and then expands to a three-dimensional shape.

The energy stored in the resilient elements may be stored by deforming the elements, or by providing, as part of the elements, airtight volumes which can be inflated. Inflating the volumes causes them to expand, providing a resilient element. For example, the struts may be formed as inflatable volumes. In order to use the purification device, the struts are inflated, e.g. with a simple pump, establishing the tension which causes the struts to expand the water collecting device. Thus, driving the expansion mechanically also includes the use of such pneumatic energy storage, which is converted to mechanical forces driving the expansion.

In another preferred embodiment of the invention, the energy for expanding the water collecting device is stored by a resilient element which has a porous or sponge-like structure. Such an element also may comprise mechanical water filtering and/or chemical purification functions.

In yet a further preferred embodiment of the invention, the expansion means is manually activated, for example by directly driving the expansion, or by storing energy in a resilient element, e.g. by manually deforming (compressing or loading) a spring or another elastic element. The elastic element then gradually relaxes while the water collecting device expands.

In a further preferred embodiment of the invention, the water collecting device comprises a supply of alimentary additives such as nutrients or vitamins. The additives are dissolved or diluted or mixed with the filtered water collecting in the water collecting device.

In a further preferred embodiment of the invention, the purification device comprises a watertight outer envelope in which the water collecting device may be arranged. The outer envelope may be welded or otherwise attached to the water collecting device, or may be a loose component. If the outer envelope is attached to the water collecting device, it may be either put over the water collecting container or pulled back to expose the water collecting device for filtering (when immersed in water) or for cleaning the filter area. When the outer envelope is arranged to contain the water collecting device, it can preferably be closed around the water collecting device, e.g. by a Minigrip®—like sealing mechanism. In another application of the invention, the filtration device is not submerged as a whole, but the outer envelope is filled with water, and the water collecting device expands within the outer envelope, drawing in the water from the outer envelope.

The volume of the water collecting device is preferably in the range of 0.5 liters to 2 liters, with its dimensions being, for example, 150 by 80 by 40 millimeters or more.

Further preferred embodiments are evident from the dependent patent claims. Features of the method claims may be combined with features of the device claims and vice versa.

BRIEF DESCRIPTION OF THE DRAWINGS

The subject matter of the invention will be explained in more detail in the following text with reference to preferred exemplary embodiments which are illustrated in the attached drawings, in which:

FIG. 1 schematically shows the use of a water collecting device for water purification according to the invention;

FIG. 8 shows a water collecting device comprising a helical expansion means; and FIG. 9 shows a water collecting device with a manually operable expansion means.

The reference symbols used in the drawings, and their meanings, are listed in summary form in the list of reference symbols. In principle, identical parts are provided with the same reference symbols in the figures.

DETAILED DESCRIPTION OF PREFERRED EMBODIMENTS

Figure 2:
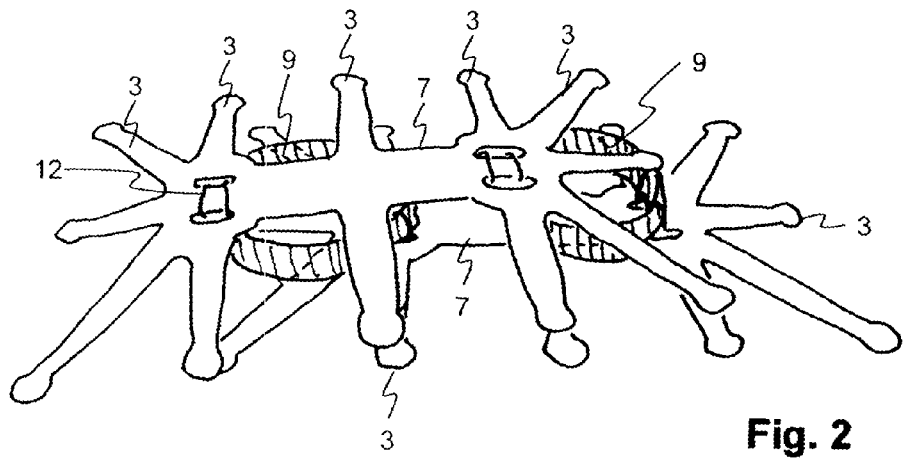
FIG. 2 shows an expansion means of a first embodiment of the invention in a transport and storage configuration.

FIG. 1 schematically shows the use of a water collecting device 1 for water purification according to the invention. At the top of FIG. 1 there is a representation of the water collecting device 1 in a reduced volume state, right after submerging the water collecting device 1. The water collecting device 1 comprises a filter membrane 2, which constitutes the walls of the water collecting device 1 itself, and a frame made up of struts 3. A resilient element 4, such as a spring, is arranged to push opposing sides of the frame apart, increasing the volume of the water collecting device 1. An outlet 6 serves to extract the filtered water. The outlet 6 is either openable and reclosable, or has a valve function which allows water and air to exit the water collecting device when pressure is applied to the water collecting device. Also shown are optional straps 14 for manually driving or assisting in the expansion of the device.

When the water collecting device 1 is submerged, the spring 4 is released. The spring 4 gradually increases the volume of the water collecting device 1, as water flows though the filter membrane 2 into the water collecting device 1. When the maximum volume has been reached (bottom part of FIG. 1), the water collecting device 1 can be retrieved and emptied by means of the outlet 6.

Since, for this embodiment, all surfaces of the water collecting device are made of the filter material 2, the water collecting device 1 should be entirely submerged in order to prevent air from being sucked in through the filter membrane 2. For other embodiments, in which only part of the water collecting device surface works as a filter, it is allowable to submerge only those filter surfaces. Along some of the edges 5 of the water collecting device 1, the filter membrane 2 may be welded together, for example, at front and back end sections of the water collecting device 1. One of the welds shown comprises an eyelet 8 for attaching the device to a weight or an external support (not shown) for submerging the water collecting device 1.

For typical filter membranes, pressure differences of typically 10 mbar or more are sufficient to drive the flow of water through the membrane. Given a water collecting device 1 in the shape of a 20 cm by 20 cm pillow, that is, with an active surface of 800 cm$^2$, a force of ca. 40 N will suffice to push opposing sides of the water collecting device 1 apart and to create the pressure difference that drives the flow of water into the water collecting device 1. Depending on the exact filter material, the device will take between ca. 10 minutes and less than one minute to filter one liter of water.

Figure 3:
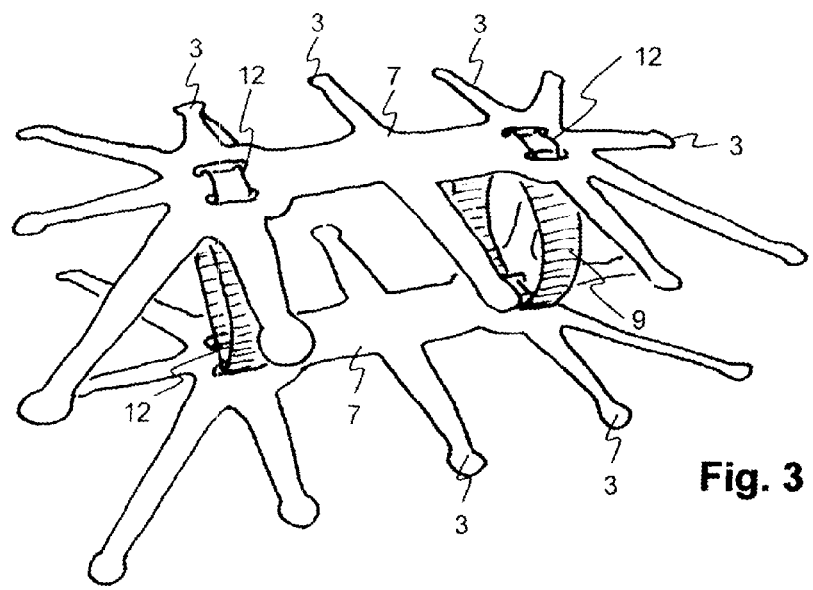
FIG. 3 shows said expansion means in a ready-to-use configuration.
Figure 4:
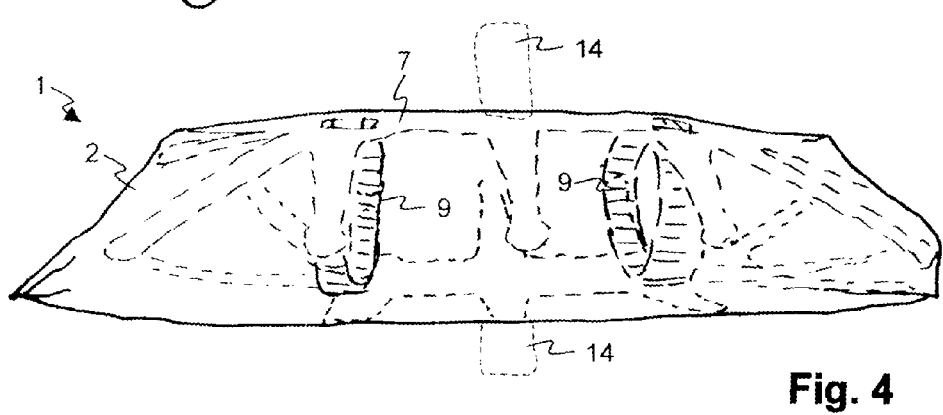
FIG. 4 shows said expansion means in a ready-to-use configuration inside the corresponding water collecting device.

FIG. 2 shows an expansion means of a first embodiment of the invention in a transport and storage configuration. The expansion means comprises two support structures 7 comprising several struts 3, and two O-shaped springs 9 serving as resilient elements 4. The support structures 7 themselves may also exhibit a certain resilience. Both the support structures 7 and the O-shaped springs 9 are made of a plastic material, preferably from sheets of material, such that they exhibit a certain stiffness within the plane of the sheet, and a comparatively larger elasticity in other directions. During transport and storage, the O-shaped springs 9, preferably, are in an unloaded state, which prevents them from losing their resilience. The O-shaped springs 9 and the support structures 7 are folded flat, preferably inside a corresponding water collecting device. In order to use the water collecting device, the O-shaped springs 9 and support structures 7 are unfolded, whereby the O-shaped springs 9 snap and/or lock into a position in which they press the support structure 7 away from each other. FIG. 3 shows said expansion means in the resulting state, that is, in a ready-to-use configuration. This snapping action is accomplished, e.g. by pulling flat sections of the support structures 7 and the O-shaped springs 9 against one another by means of rubber bands 12. In the folded state, said flat sections of the support structures 7 and the O-shaped springs 9 are at right angles to one another and the rubber bands 12 going around both of them are elongated. In the unfolded state, said flat sections lie flat on each other and the rubber bands 12 are shortened. The arrangement will remain in this configuration unless a shearing force is applied. A vertical compression force pushing the support structures 7 against each other compresses the O-shaped springs 9 and brings the water collecting device 1 into the reduced volume state. FIG. 4 shows said expansion means in a ready-to-use configuration inside the corresponding water collecting device. Also shown are optional straps 14 for manually driving or assisting in the expansion of the device.

Figure 5:
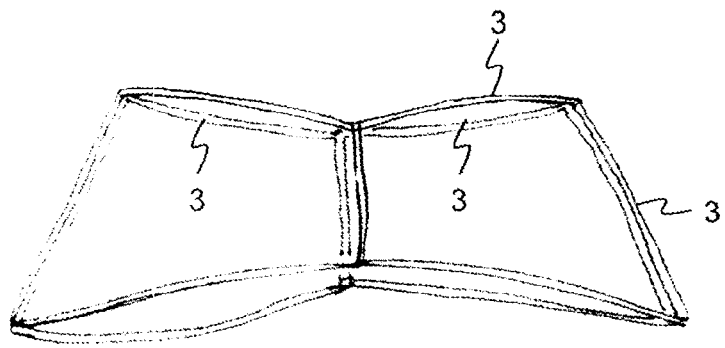
FIG. 5 shows a frame of a further embodiment of the invention in a reduced volume configuration.
Figure 6:
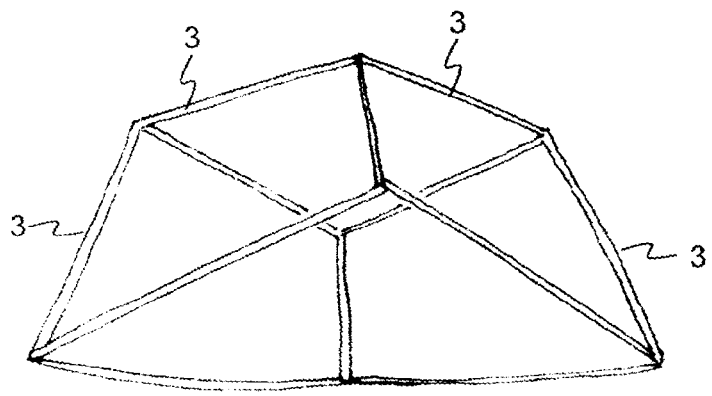
FIG. 6 shows said frame in an expanded configuration.

FIG. 5 shows a frame of a further embodiment of the invention in a reduced volume configuration. The frame is constituted of a set of struts 3 made of a flexible and elastic material, preferably metal or a plastic that is not subject to material fatigue. In FIG. 5, the frame is compressed by forcing the two middle struts 3 together. FIG. 6 shows said frame in a released or expanded configuration.

Figure 7:
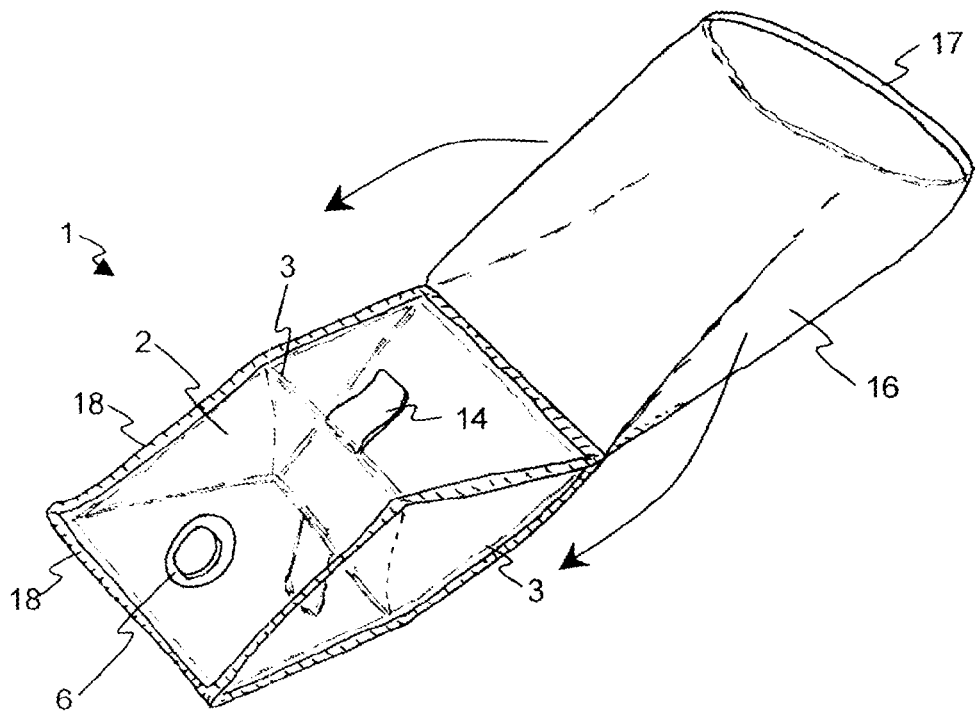
FIG. 7 shows said frame inside the corresponding water collecting device.

FIG. 7 shows said frame inside the corresponding water collecting device 1, again in the expanded configuration. The frame defined by the struts 3 is arranged inside the volume formed by the membrane 2, which may be welded together at the edges by welding seams 18. If the volume is expanded by the resilience of the struts 3, then no further expansion means is mandatory, otherwise, a spring or other expanding device for pushing selected struts 3 apart may be arranged inside the volume, as in the embodiment of FIG. 1. Straps 14 are attached to the membrane and preferably also to struts 3. An optional watertight outer envelope 16 may be attached to the device 1, arranged in an extended position as shown in the figure. The outer envelope 16 may be folded around the collecting device 1 (as indicated by arrows) and then closed by a closing means or closure 17, e.g. a Minigrip® seal. Such an outer envelope 16 may of course be added to any of the other embodiments as well. The outer envelope 16 may also be detached from the device 1.

FIG. 8 shows a cylindrical water collecting device 1 comprising a helical spring 10 in an expanded state. In the reduced volume state, the helical spring 10 is compressed to an essentially planar configuration, and the filter membrane 2 folds accordingly.

FIG. 9 shows a water collecting device 1 with a manually operable expansion means in a half-filled state and a full (maximum volume) state. The device comprises rigid rings 11 attached to the inside of the (filter membrane) surface 2 of the device 1. When pulled apart by the expansion means, the rings 11 define a cylindrical volume which is spanned by the membrane 2. The mechanically driven expansion means is constituted by a rod 12 which is guided through a cap 13 attached to a first end of the device, and pushes an opposing end of the device away from the first end. A resilient element such as a spring, e.g. an O-shaped spring 9, may be arranged to be compressed by the rod 12 when the rod 12 is pushed into the device. After this, the spring 9 expands gradually as water enters the device through the filter 2. When the spring 9 is expanded, the rod 12 can be pushed in again, repeating the process until the device 1 is full. In an alternative embodiment, part or all of the surface of the collecting device 1 is elastic, and is tensioned when the rod 12 is pushed into the device. The cap 13 preferably comprises a screw mechanism or a ratchet mechanism which prevents the rod 12 from sliding out after being pushed in. If a screw mechanism is used, then one part of the cap can be turned with respect to the other one, or the rod can be turned with respect to the rest of the device in order to create the linear movement of the rod with respect to the cap when expanding the device 1. The outlet, optional straps etc. are omitted in FIG. 9 for clarity.

While the invention has been described in present preferred embodiments of the invention, it is distinctly understood that the invention is not limited thereto, but may be otherwise variously embodied and practised within the scope of the claims.

LIST OF DESIGNATIONS

| | |
|---|---|
| 1 | water collecting device |
| 2 | filter membrane |
| 3 | strut |
| 4 | resilient element |
| 5 | edge |
| 6 | outlet |
| 7 | support structure |
| 8 | eyelet, grommet |
| 9 | O-shaped spring |
| 10 | helical spring |
| 11 | ring |
| 12 | rubber band |
| 13 | cap |
| 14 | strap |
| 15 | rod |
| 16 | envelope |
| 17 | closure |
| 18 | welding seams |

What is claimed is:

1. A method for water purification, using a water purification device that includes a water collecting device having a surface defining a variable volume, wherein at least part of the surface of the water collecting device comprises a filter area, the filter area being permeable to water and allowing water to enter the water collecting device when the filter area is submerged in water,
   wherein the device further comprises an expansion device for exerting a force for increasing the volume of the water collecting device, beginning at a reduced volume configuration and thereby drawing water through the filter area into the water collecting device, ending at an expanded configuration, the method comprising the steps of
   compressing the water collecting device such that it is in the reduced volume configuration if the water collecting device is not in the reduced volume configuration;
   submerging at least the filter area of the water collecting device in water;
   allowing the water collecting device to expand, whereby water enters the water collecting device through the filter area;
   when a predetermined amount of filtered water has accumulated inside the water collecting device, removing the water collecting device from the water;
   draining the accumulated filtered water from the water collecting device.

2. The method of claim 1, wherein the filter area through which the water enters the water collecting device comprises a flexible sheet material.

3. The method of claim 1, wherein the filter area, through which the water enters the water collecting device, comprises at least a quarter of the surface of the water collecting device.

4. The method of claim 2, wherein the filter area, through which the water enters the water collecting device, comprises at least a quarter of the surface of the water collecting device.

5. The method of claim 1, wherein
   when the water collecting device is in the reduced volume configuration, the expansion device comprises stored energy;
   release of said stored energy causes the volume of the water collecting device to increase.

6. The method of claim 5, wherein
   when the water collecting device is in the reduced volume configuration, it is in an essentially flat, compressed configuration;
   the increase of volume of the water collecting device corresponds to the expansion device assuming the expanded configuration.

7. The method of claim 5, wherein
   at least one resilient element of the expansion device releases stored energy by changing its shape.

8. The method of claim 5, wherein
   one or more struts that form a frame supporting the water collecting device constitute resilient elements and release stored energy, thereby increasing the volume of the water collecting device and drawing water through the filter area into the water collecting device.

9. The method of claim 7, comprising the step of
   prior to using the water collecting device, arranging the at least one resilient elements such that they are loaded, by bringing the water collecting device into the reduced volume configuration,
      wherein in a transport configuration of the water collecting device, the at least one resilient element is not loaded (i.e. it is in a minimum energy state).

10. The method of claim 8, wherein in addition to the struts, additional resilient elements
   effect a change of angle between adjacent struts; or
   push sections of the struts away from each other; or
   pull sections of the struts towards each other;
   and thereby increase the volume of the water collecting device.

11. The method of claim 1, wherein
   when compressing the water collecting device such that the water collecting device is in the reduced volume configuration, a further step is performed of allowing air trapped in the water collecting device to escape through an outlet of the water collecting device;

wherein draining the accumulated filtered water from the water collecting device comprises draining the water through the outlet.

12. The method of claim 5, wherein at least one resilient element of the expansion device releases stored energy by at least one of bending, unbending, expanding, or contracting.

* * * * *